United States Patent
Vaganov

(10) Patent No.: US 6,700,688 B2
(45) Date of Patent: Mar. 2, 2004

(54) ROLLING MIRROR APPARATUS AND METHOD OF USE

(75) Inventor: Vladimir Vaganov, Los Gatos, CA (US)

(73) Assignee: MegaSense, Inc., Sunnyvale, CA (US)

(*) Notice: Subject to any disclaimer, the term of this patent is extended or adjusted under 35 U.S.C. 154(b) by 0 days.

(21) Appl. No.: 09/939,317

(22) Filed: Aug. 24, 2001

(65) Prior Publication Data
US 2003/0039016 A1 Feb. 27, 2003

(51) Int. Cl.⁷ .............................................. G02B 26/08
(52) U.S. Cl. ....................................... 359/223; 359/871
(58) Field of Search ................................. 359/198, 223, 359/224, 225, 871, 872

(56) References Cited

U.S. PATENT DOCUMENTS 5,629,794 A * 5/1997 Magel et al. ................ 359/214
5,696,619 A * 12/1997 Knipe et al. ................ 359/224
6,379,510 B1 * 4/2002 Kane et al. ............. 204/192.27

* cited by examiner

Primary Examiner—Euncha Cherry

(57) ABSTRACT

A rolling micromirror is disclosed which comprises a micromirror guided in movement by a reference surface. The micromirror is suspended adjacent to the reference surface by a suspension element. An actuator moves the micromirror in relationship with a control signal. The suspension element provides a restoring force that returns the micromirror to an initial position when the actuator applies less than a minimal force to the micromirror. The micromirror optionally includes a stationary or movable pivot point about which the micromirror rotates and tilts. The preferred embodiment is integrated on a single substrate and is a micro-electro-mechanical device.

35 Claims, 13 Drawing Sheets

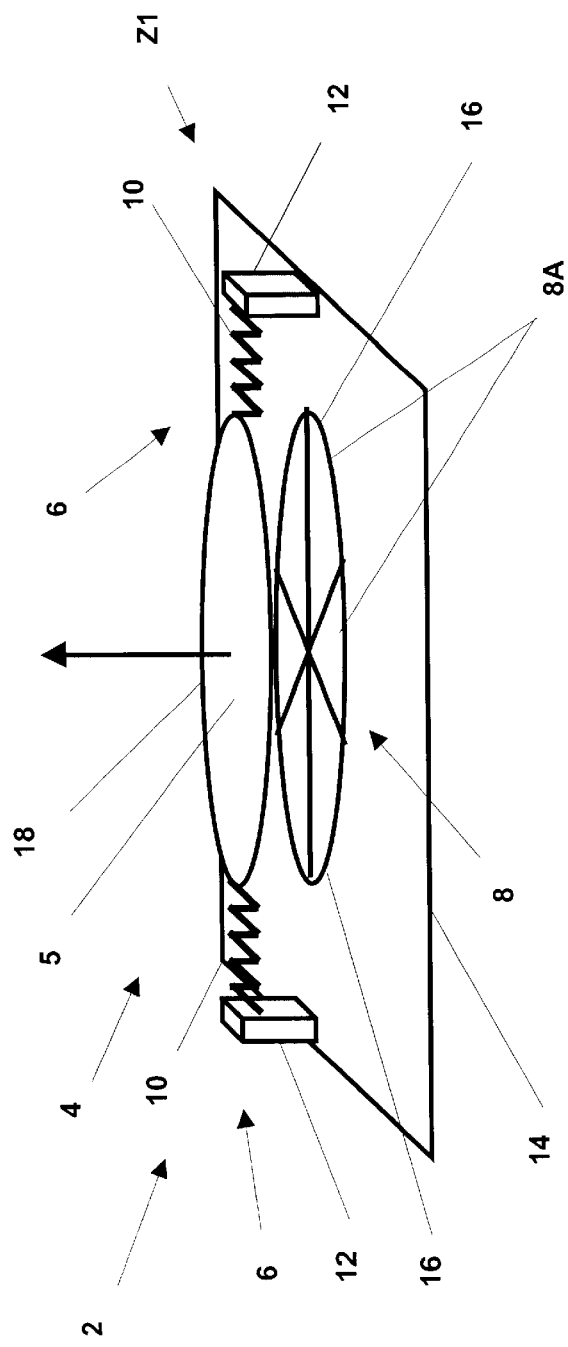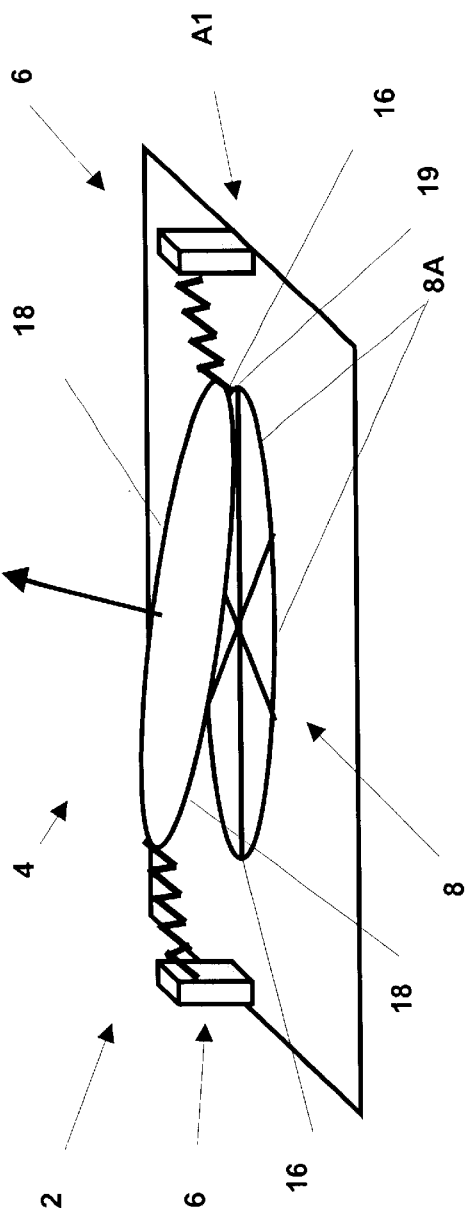

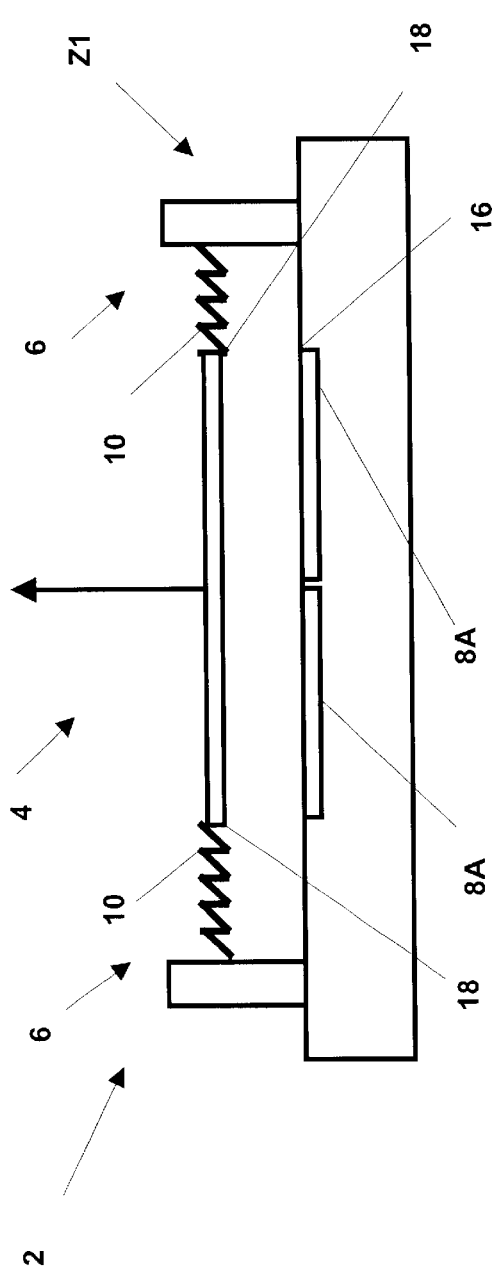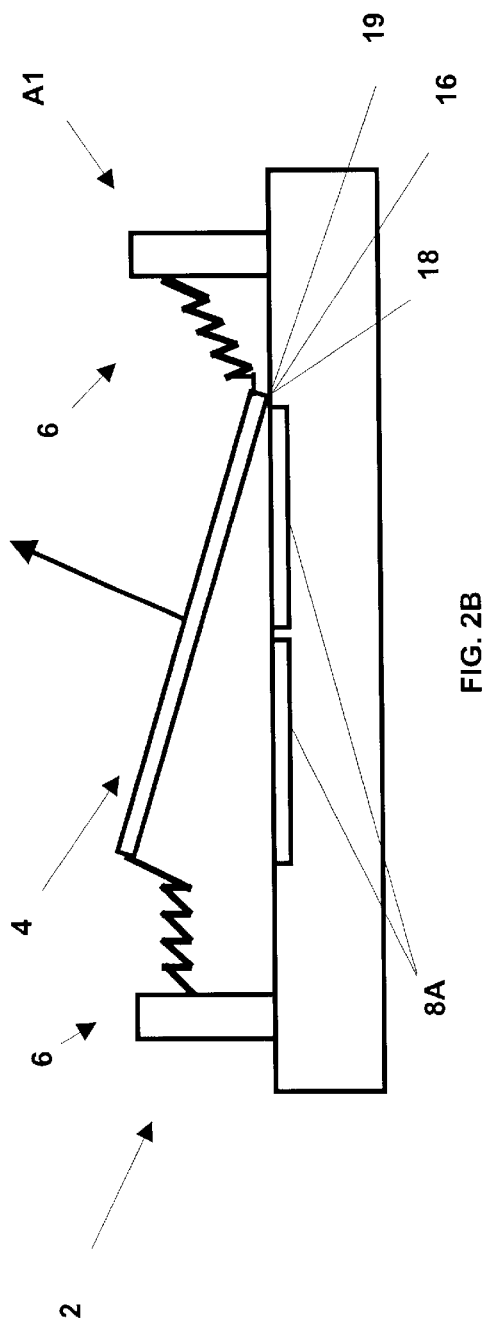

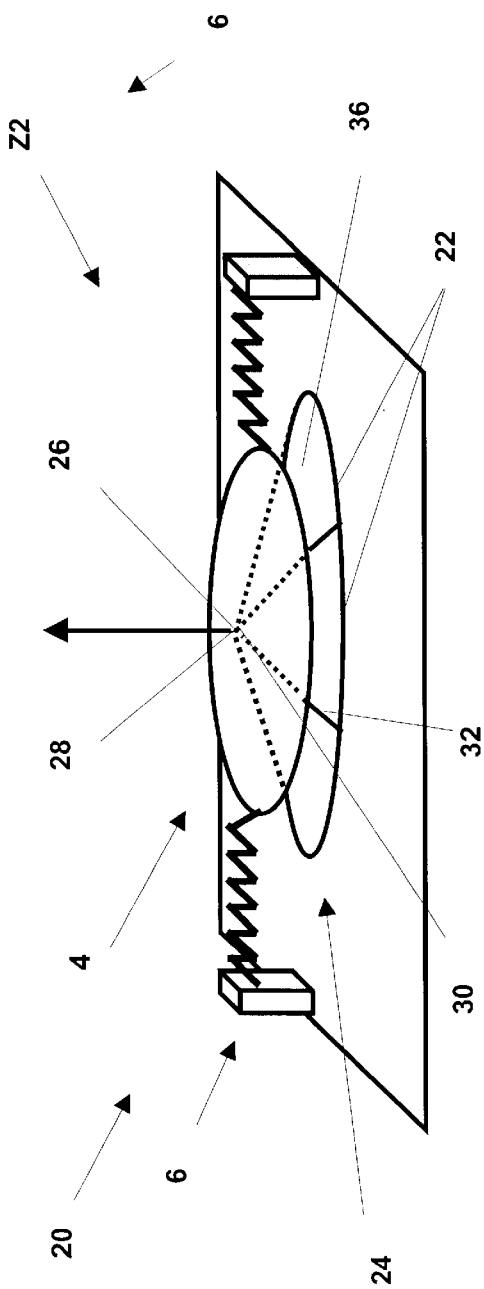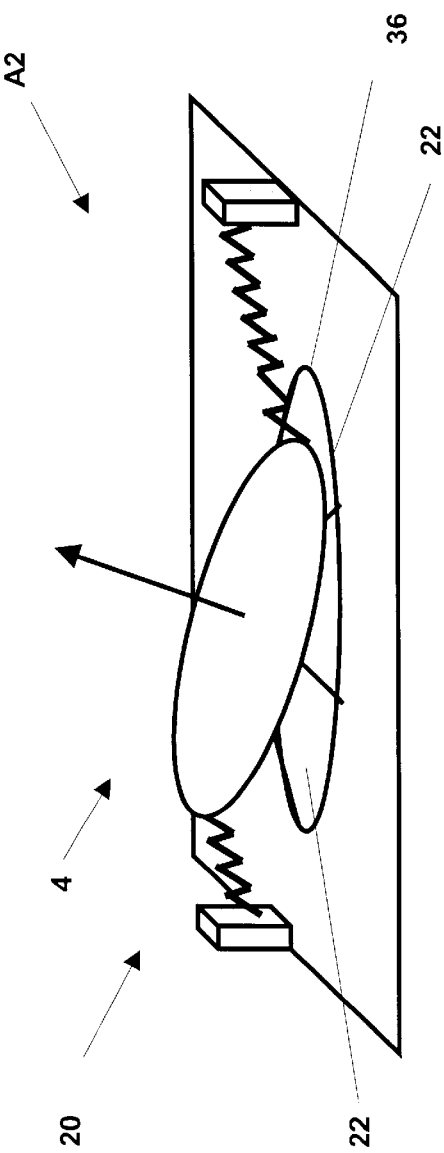

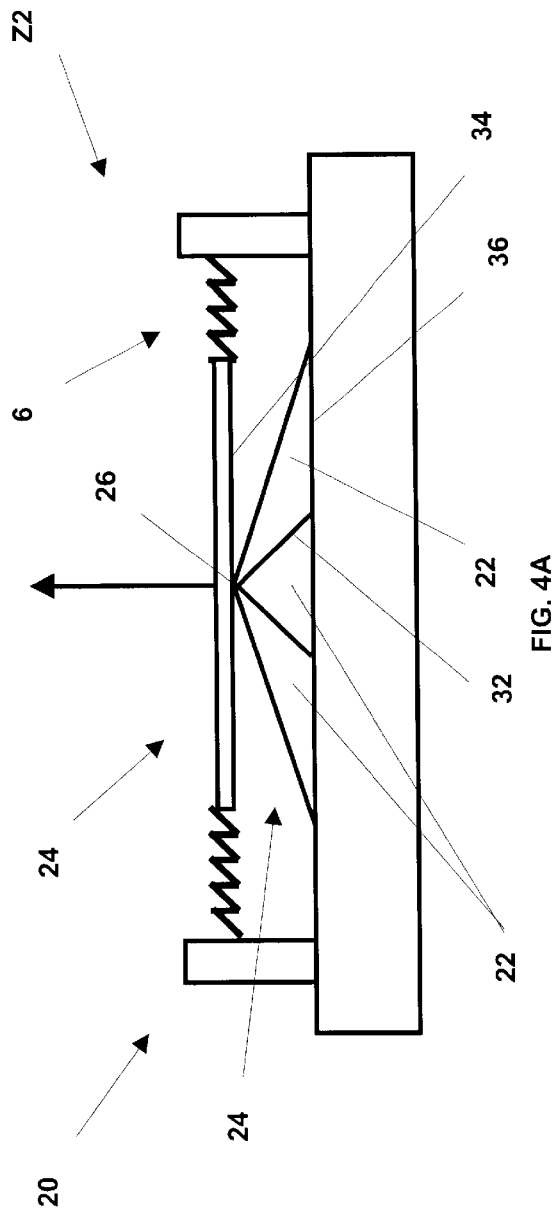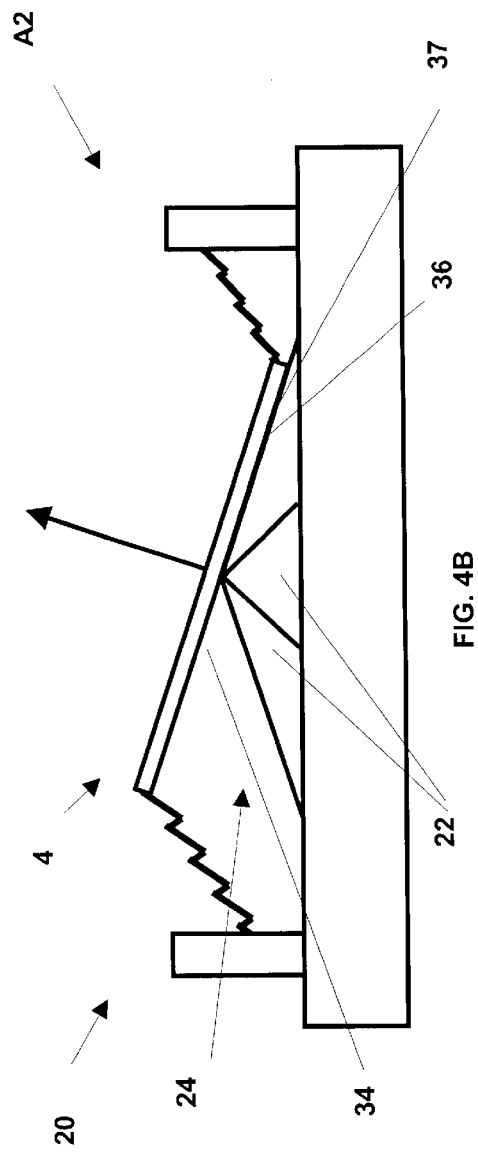

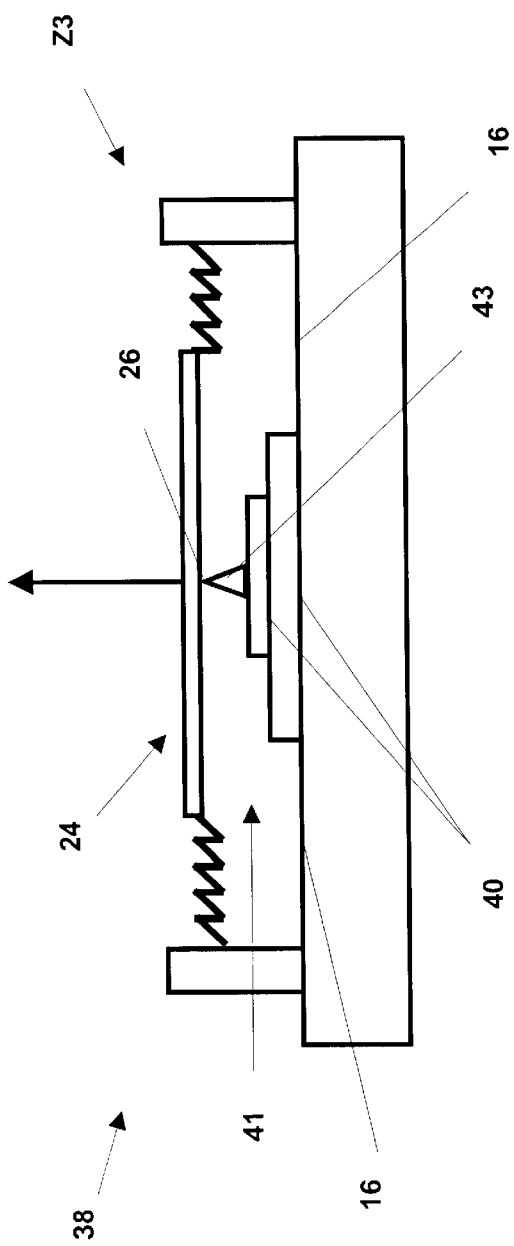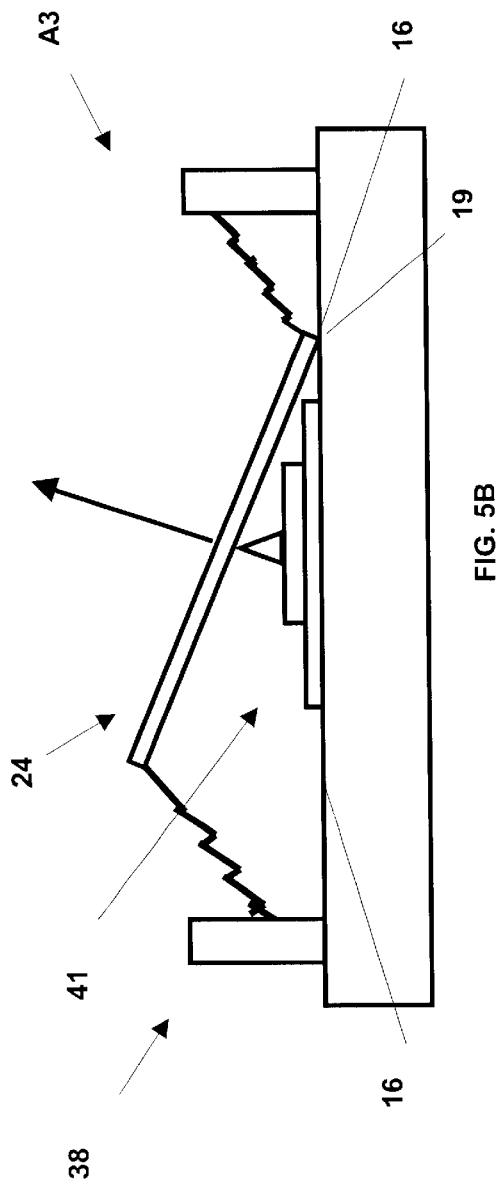

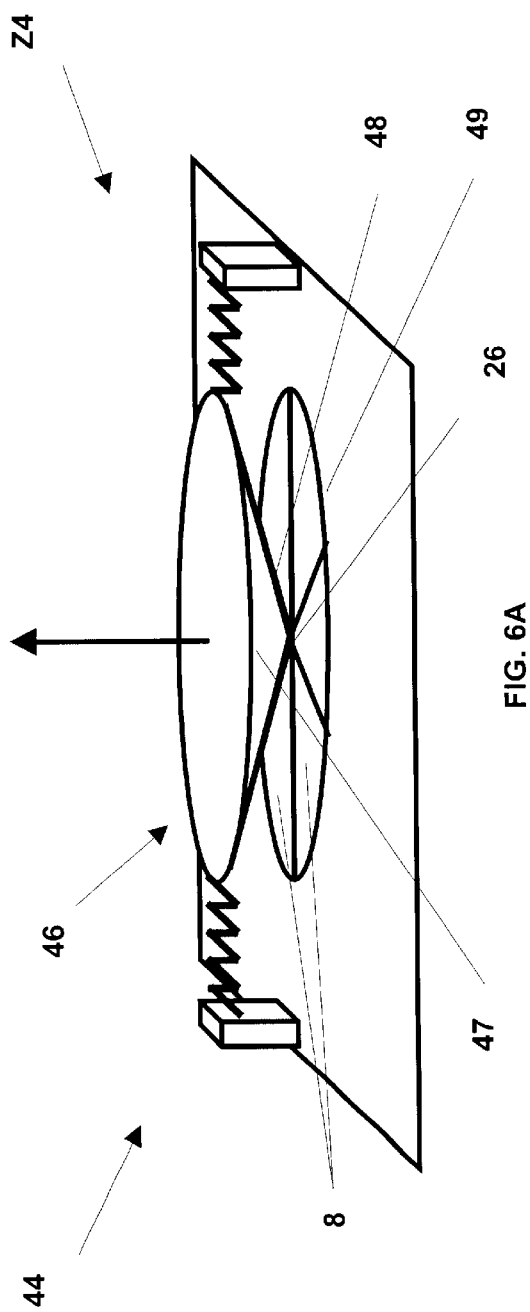
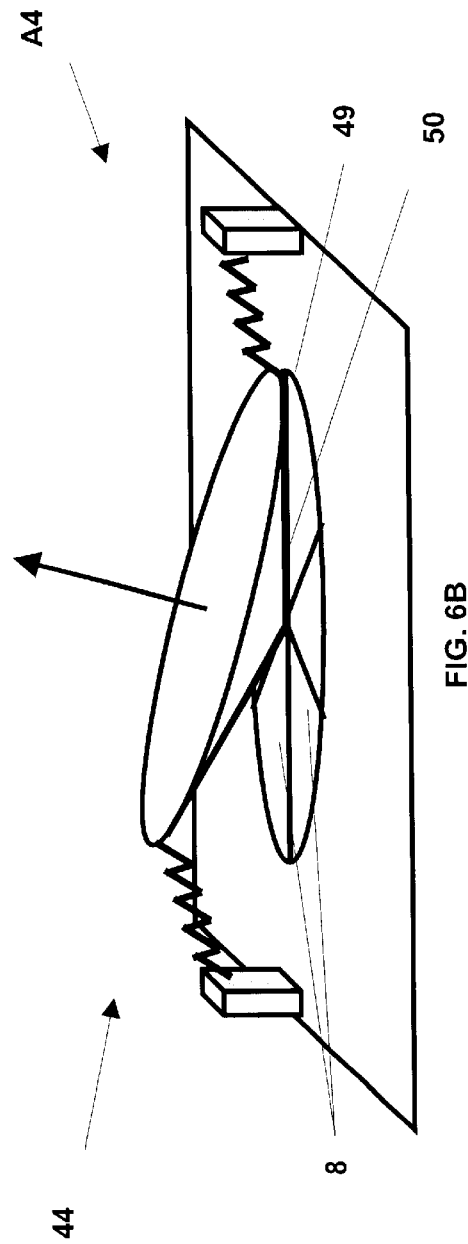

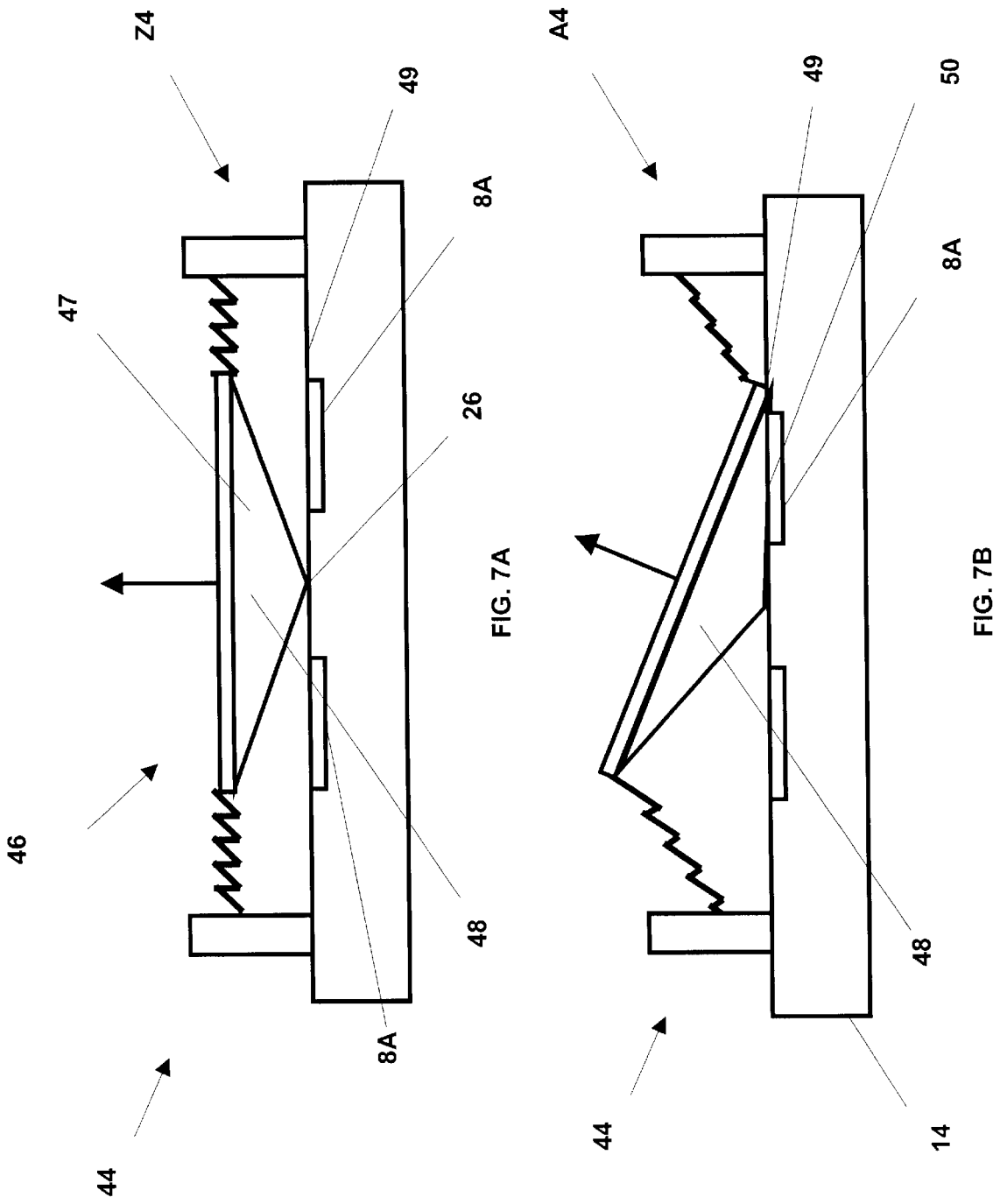

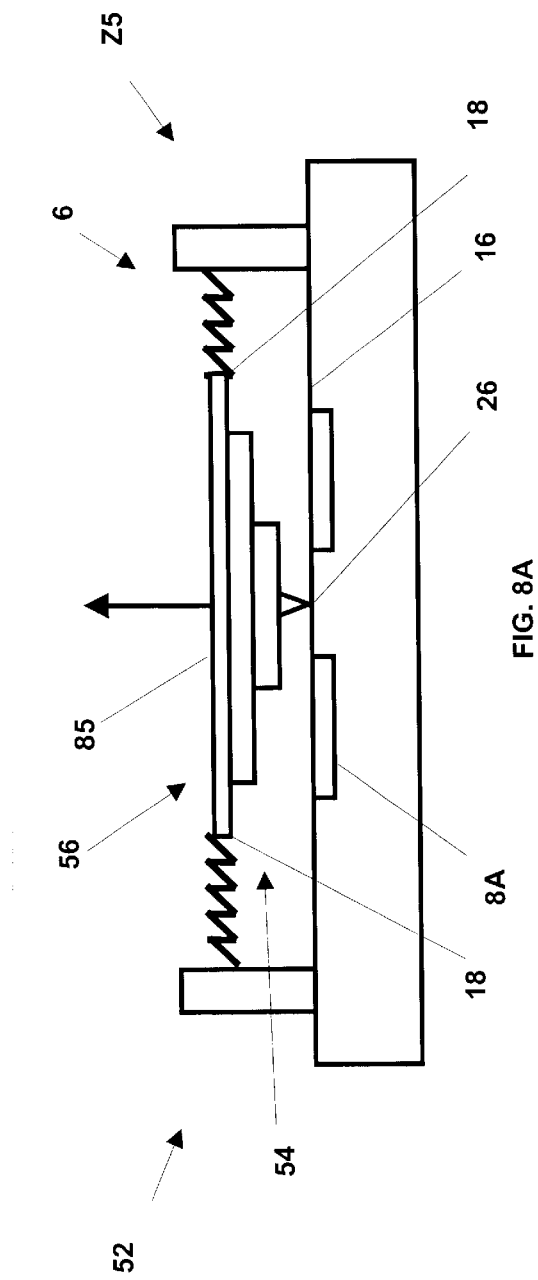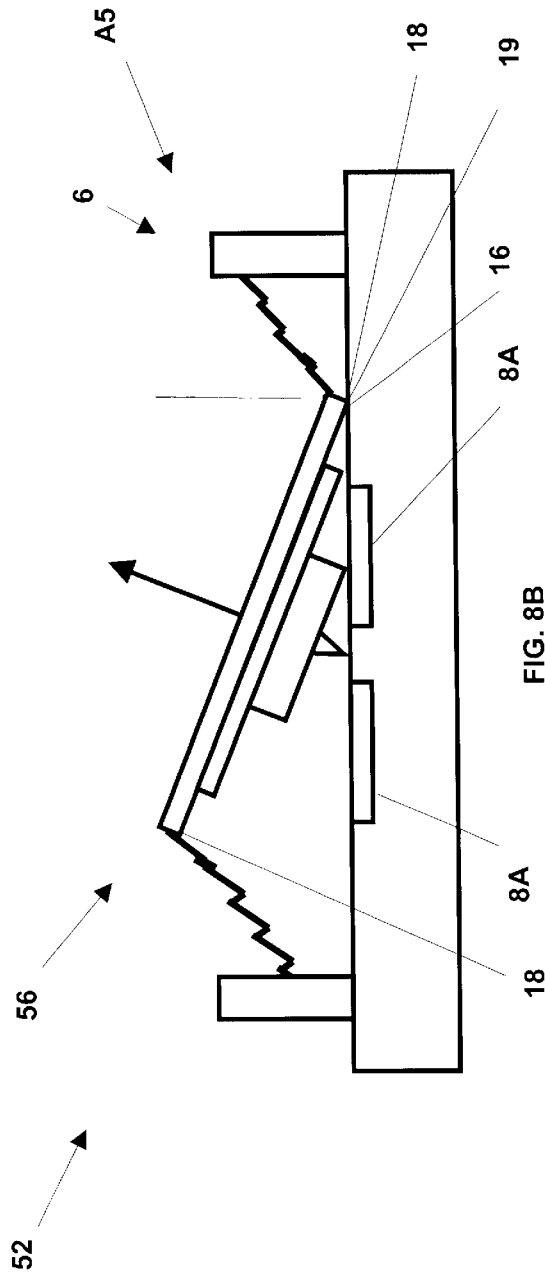

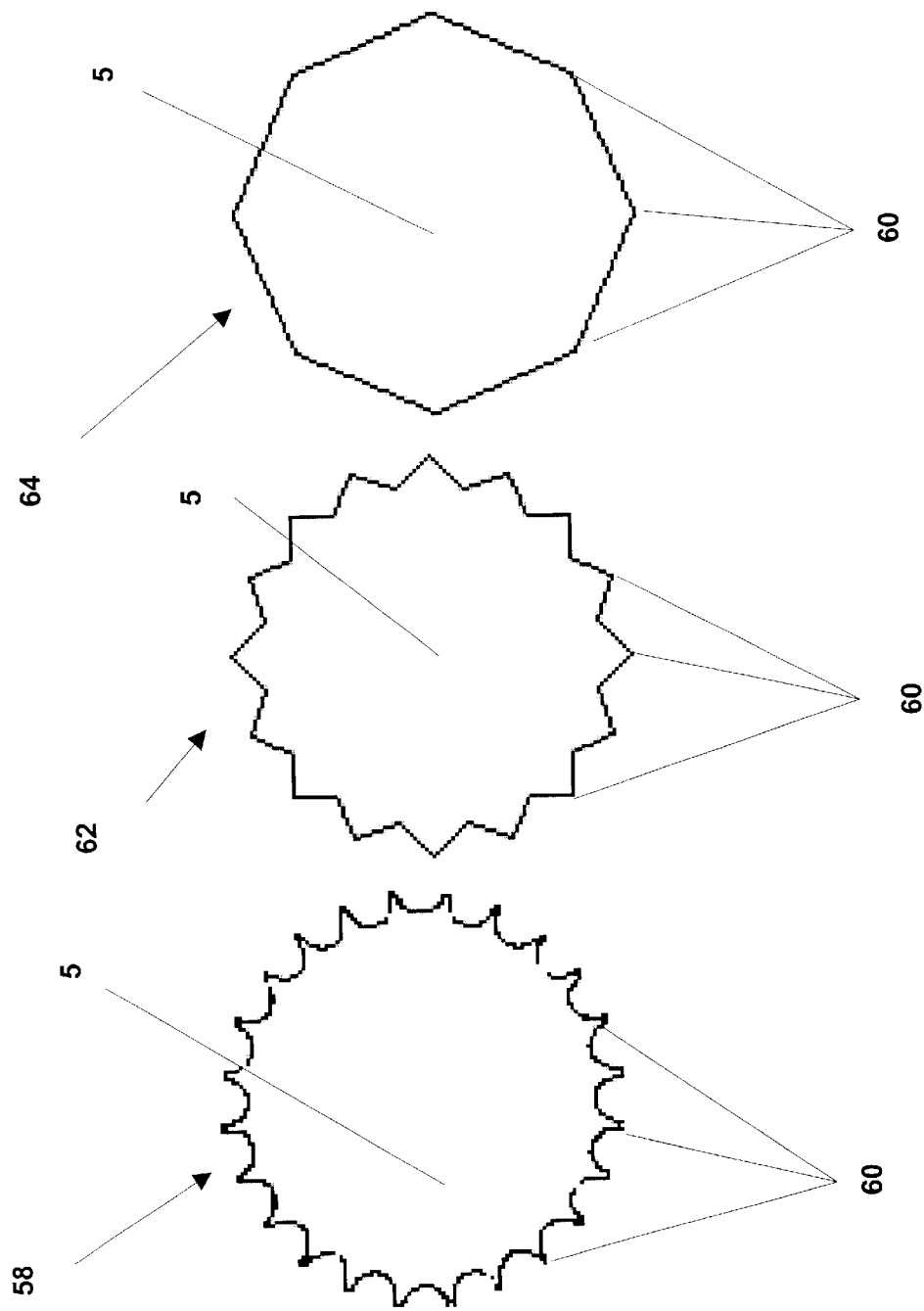

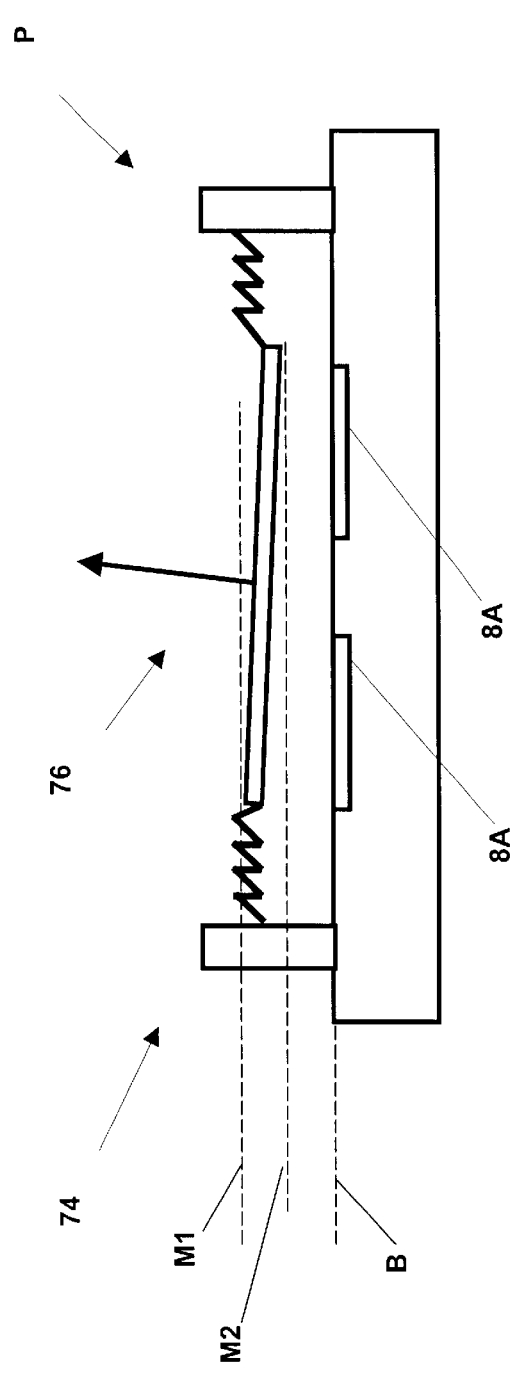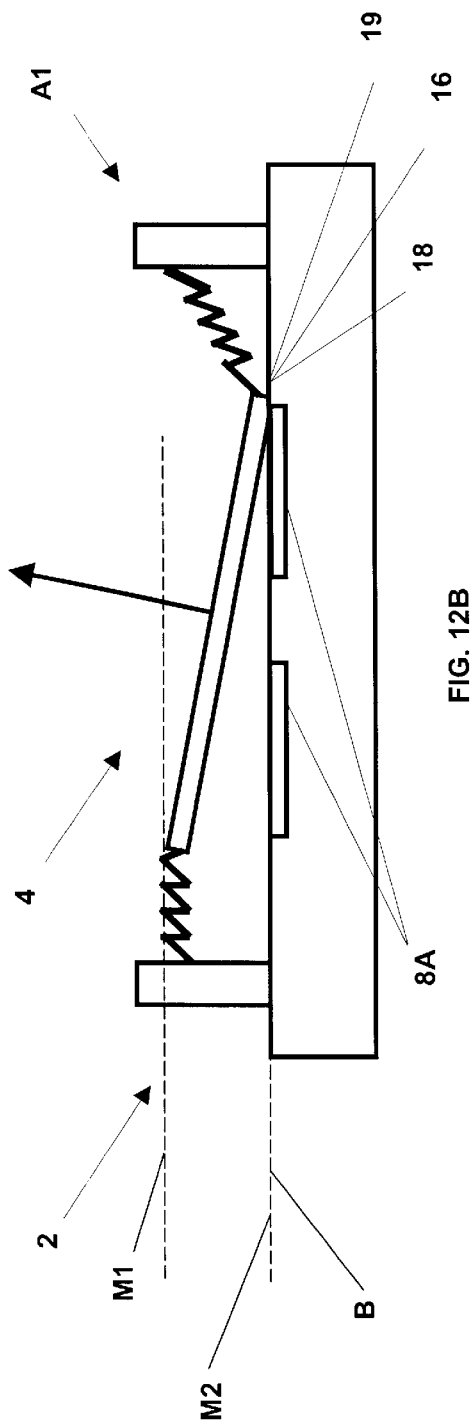

ROLLING MIRROR APPARATUS AND METHOD OF USE

FIELD OF THE INVENTION

The present invention relates generally to the use and design of optical components for communications systems. The present invention more particularly relates to electromechanical optical devices that reflect and redirect an optical signal.

BACKGROUND OF THE INVENTION

Certain prior art micro-electro-mechanical systems, or MEMS, employ mirrors that are positioned by means of an electrostatic actuator. Typically an actuator tilts the mirror about a single axis. The degree of rotational freedom of the mirror is usually small and tightly limits the maximum available range of a trajectory of a reflection of a light beam. Prior art trajectories of reflected light beams are therefore typically linear, straight and short in length. The modest ranges of prior art trajectories limit the number of receiving waveguides that can be positioned to fall within the prior art trajectory. This prior art limitation in the quantity of waveguides to which the mirror can redirect an incident light beam correspondingly limits the number of light beam or optical signal channels available for optical signal transmission from the mirror.

There is, therefore, a long felt need to increase the trajectory length of the receiving plane in order to increase the number of receiving waveguides available for receiving the light beam as reflected by the movable mirror, and to increase the accuracy of positioning of the light beam on a receiving plane or an output device or waveguide.

OBJECTS OF THE INVENTION

It is an object of the present invention to provide a method and apparatus that increases the length of a trajectory located within a receiving plane for the reflection of a light beam from a movable mirror by movement of the mirror in more than one dimension.

It is an object of certain alternate preferred embodiments of the present invention to provide a method and apparatus that increases the accuracy of redirecting a light beam from the movable mirror and onto a receiving plane of the reflected light beam.

It is an object of certain still alternate preferred embodiments of the present invention to provide a method and apparatus that increases the number of light beam receiving positions available to receive the reflected light beam, whereby the number of channels transmitting the reflected light beam from the apparatus is increased.

It is an additional object of certain other preferred embodiments of the present invention to provide a method and apparatus that decreases the driving voltage required to move a movable mirror.

It is an object of certain alternate preferred embodiments of the present invention to provide a method and apparatus that includes and comprises an electro-mechanical semiconductor device to reflect and redirect an optical signal.

It is an object of certain further alternate preferred embodiments of the present invention to provide a method and apparatus that comprises a micro-electro-mechanical system, or MEMS, to reflect and redirect an optical signal.

It is an object of certain further alternate preferred embodiments of the present invention to provide a method and an apparatus that provides a micromirror that reflects an optical signal along a circular reflection pathway.

It is an object of certain still further alternate preferred embodiments of the present invention to provide a method and an apparatus that provides a micromirror that reflects an optical signal within a circular area, or another suitable surface area shape known in the art.

It is an object of certain yet alternate preferred embodiments of the present invention to provide a method and an apparatus that provides a micromirror having a pivot point and that enables the movement of the micromirror in least one rotational degree of freedom.

It is an object of certain yet alternate preferred embodiments of the present invention to provide a method and an apparatus comprising a micromirror and that enables a micromirror to move within at least two degrees of freedom.

It is an object of certain yet other alternate preferred embodiments of the present invention to provide a method and an apparatus comprising a micromirror, wherein the apparatus enables a micromirror to move from one discrete position to at least one other discrete position.

SUMMARY OF THE INVENTION

According to the method of the present invention, a rolling mirror, having a movable micromirror is provided. The invented rolling mirror redirects a light beam in a trajectory, where the trajectory lies within a receiving plane. Various alternate preferred embodiments of the invented rolling mirror generate trajectories having a suitable two dimensional shape known in the art, for example as selected from the group of shapes consisting of a circle, a substantially circular shape, a partially circular shape, and an ellipse.

A preferred embodiment of the invented rolling mirror includes a movable micromirror having a body, a reference surface, an actuator, a suspension element and an optional pivot point. The actuator is operatively coupled with the micromirror and applies force to move the micromirror. The micromirror moves along a path of motion that includes at least one section within which the motion of the micromirror is guided by contact with the reference surface. As the micromirror moves about the reference surface a reflection of a light beam incident to the micromirror is reflected at a movable point within a certain trajectory of a receiving plane. This trajectory is partially determined by the shape of the body of the micromirror and the shape of the reference surface. The reference surface may have one, two, or a plurality of sections. A section may comprise one, two or a plurality of suitable surface shapes known in the art, to include a plane surface, a conical surface, a curved surface, an arced surface, a ramped surface, a spiraled ramp surface and a helical surface.

The micromirror has a reflecting surface and a body with a contact edge, and an optional micromirror pivot feature. The contact edge may be located on or proximate to a periphery of the micromirror or the reflecting surface, or alternatively, in certain alternate preferred embodiments of the present invention the contact edge may be located on the micromirror body in a path that is of uniform or of varying distance from the periphery of the micromirror or the reflecting surface. The reflecting surface may be a concave, convex or flat reflecting surface in various preferred embodiments of the present invention. The micromirror may be shaped as a relatively thin body having a larger two-dimensional reflecting surface. Alternatively, the micromirror may have a cone shaped body or a frustum shaped body, or a body shaped according to another suitable shape known in the art.

Certain alternate preferred embodiments of the present invention comprise a micromirror body having two or more body layers, where at least two body layers have different cross-sectional sizes or shapes. Certain alternate preferred embodiments of the present invention comprise a cone-like micromirror body, where the cone-like micromirror body is similar to, or topographically equivalent to, or contained within a conical bounding cone. The cone-like micromirror body may have two or more micromirror body layers. The micromirror body layers have different cross-sectional sizes, and the smaller of two body layers, or the smallest body layer of a plurality of body layers, is positioned closer to a center of the actuator or a plurality of actuators.

The actuator of the preferred embodiment may be a suitable actuator known in the art, to include one, two or a plurality of actuators selected from the group consisting of an electro-static actuator, a piezo-electric actuator, a thermo-mechanical actuator, an electromagnetic actuator, and a polymer actuator, or other suitable actuators known in the art. One or more polymer actuators may be selected from the group consisting of an electro-active polymer actuator, an optical-active polymer, a chemically active polymer actuator, a magneto-active polymer actuator, an acousto-active polymer actuator and a thermally active polymer actuator, or other suitable polymer actuators known in the art.

Certain preferred embodiments of the present invention comprise an actuator assembly, where the actuator assembly has two or more actuator layers, where at least two actuator layers have different cross-sectional sizes or shapes. Certain alternate preferred embodiments of the present invention comprise an actuator comprising a plurality of low profile layers, where the height of most of the layers is small in comparison to the remaining two dimensions of the layer's cross section, and the layers are assembled together to be contained within a conical bounding surface, and/or the actuator has a shape that is substantially topologically similar to, or equivalent to, a cone.

The suspension element is operatively coupled with the micromirror and provides a restoring force that returns the micromirror to a zero actuation position when the actuator provides no force, or force below a minimum level to the micromirror. The suspension element may be or comprise one or more suitable suspension components known in the art, or as selected from the group consisting of a spring, a beam, a tether, and a diaphragm. The suspension element may be at least partly flat, corrugated and/or perforated.

In certain alternate preferred embodiments of the present invention the movable micromirror and the reference surface are pivotably coupled wherein the micromirror moves in two dimensions about a pivot point as the actuator moves the micromirror.

Certain alternate preferred embodiments of the present invention are integrated on a single substrate. Certain still alternate preferred embodiments of the present invention are incorporated as micro-electro-mechanical systems, or MEMS, or a MEMS device.

In operation, the micromirror of certain preferred embodiments is moved about the pivot point while maintaining a point of contact between the contact edge and the reference surface. The position of the micromirror is determined by forces provided by the actuator and the suspension element. The point of contact between the micromirror and the reference surface shifts along the contact edge and along the reference surface as the micromirror moves.

Other objects, features, and advantages of the present invention will be apparent from the accompanying drawings and from the detailed description which follows below.

BRIEF DESCRIPTION OF THE DRAWINGS

The present invention is illustrated by way of example and not limitation in the figures of the accompanying drawings, in which like references indicate similar elements, and in which:

FIGS. 1A and 1B are isometric views of a preferred embodiment of the present invention in a zero actuation position and in an actuated position respectively.

FIGS. 2A and 2B are side views of the preferred embodiment of the present invention of FIGS. 1A and 1B in a zero actuation position and in an actuated position.

FIGS. 3A, 3B and 3C are perspective views of a first alternate preferred embodiment of the present invention having a set of actuator plates arranged in a cone-like shape, wherein a micromirror rotates about a pivot point from a zero actuation position and to an actuated position FIGS. 4A and 4B are side views of the first alternate preferred embodiment of the present invention of FIGS. 3A, 3B and 3C in a zero actuation position and in an actuated position.

FIGS. 5A and 5B are side views of a second alternate preferred embodiment of the present invention having a pair of layers with actuators arranged in a shape that is substantially similar to, or topologically equivalent to, a cone, and wherein a micromirror is shown in a zero actuation position and in an actuated position respectively.

FIGS. 6A and 6B are isometric views of a third alternate preferred embodiment of the present invention, wherein a micromirror has a conical body, and where the micromirror is shown in a zero actuation position and in an actuated position, respectively.

FIGS. 7A and 7B are side views of the third alternate preferred embodiment of the present invention of FIGS. 6A and 6B in a zero actuation position and in an actuated position respectively.

FIGS. 8A and 8B are side views of a fourth alternate preferred embodiment of the present invention, wherein a micromirror has a body comprised of layers, and the micromirror body is substantially similar to, or topologically equivalent to, a cone, and wherein the micromirror is shown in a zero actuation position and in an actuated position respectively.

FIG. 10 has top views of three micromirrors of different shape and each having pluralities of teeth extending from the micromirror.

FIGS. 12A and 12B show and contrast the ranges of micromirror tilt motion of a prior art MEMS, as per FIG. 12A, versus the tilt range of the rolling mirror of FIG. 1, as presented in FIG. 12B.

DETAILED DESCRIPTION OF THE PREFERRED EMBODIMENT

Figure 3C:
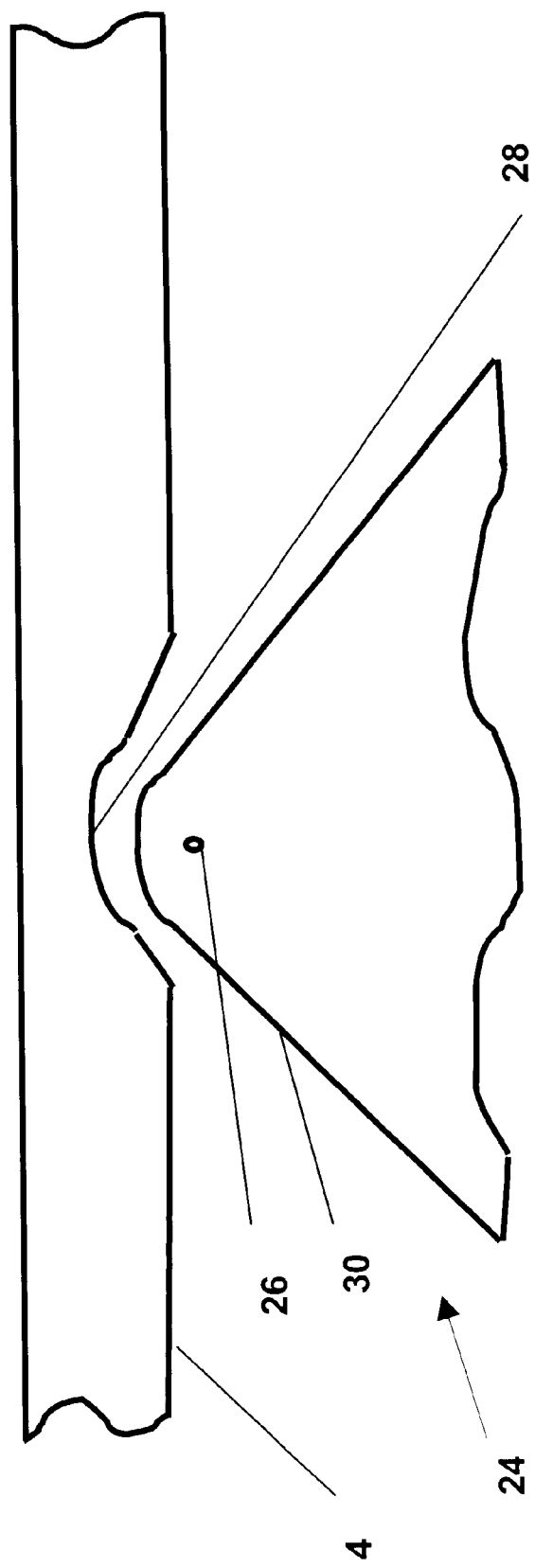

While the description above provides a full and complete disclosure of the preferred embodiments of the present invention, various modifications, alternate constructions, and equivalents will be obvious to those with skill in the art. Thus the scope of the present invention is limited solely by the appended claims.

Referring now generally to the Figures and particularly to FIG. 1A, a preferred embodiment of the present invention 2, or rolling mirror 2, has a micromirror 4 having a reflecting surface 5. The micromirror 4 is suspended by a suspension element 6 and is movable by force applied by an actuator 8. Actuator 8 comprises of a plurality of electrostatic actuators 8A. The micromirror 4 is in an initial position Z1, or zero actuation position Z1, wherein the actuator 8 provides no force, or less than a minimal amount of force, required to move the micromirror 4. The suspension element 6 comprises at least one suspension component 10. The suspension components 10 may be, or be comprised within, a diaphragm, or the components 10 may be separate, wherein each component 10 is separately attached to the micromirror 4 and to the rolling mirror 2. Alternatively or additionally, each suspension component 10 may be or comprise a tether, a beam, a diaphragm and/or a spring. In the exemplary preferred embodiment 2 of the present invention, the component 10 is mechanically connected with an individual mount 12 of a frame 14, and the frame 14 is mechanically coupled with the plurality of electrostatic actuators 8A. A flat or planar reference surface 16 encompassing the plurality of electrostatic actuators 8A is pre-positioned to make contact with a contact edge 18, or edge 18, of the micromirror 4 as the edge 18 rotates about the flat reference surface 16 of the rolling mirror 2.

Referring now generally to the Figures and particularly to FIG. 1B, the micromirror 4 has moved to an actuation position A1 wherein the edge 18 is in contact with the reference surface 16. The micromirror 4 moves while maintaining a moving point of contact 19 between the edge 18 and the reference surface 16. The movement and position of the micromirror 4 are determined by the actuation forces provided by the plurality of electrostatic actuators 8A and a restoring force provided by the suspension element 6.

Referring now generally to the Figures and particularly to FIG. 2A, a side view of the rolling mirror 2 in the zero actuation position of Z1, as shown in FIG. 1A, is presented.

Referring now generally to the Figures and particularly to FIG. 2B, a side view of the rolling mirror 2 in the actuation position of A1, as shown in FIG. 1B, is presented. The micromirror 4 may be rolled around the reference surface 16 while providing the micromirror 4 with at least one rotational degree of freedom. The rolling mirror 2 may thereby be moved as a reflecting mirror system having a single circular dimension of reflection pathway. For example, the micromirror 4 may be rotated about the reference surface 16 to form a circular reflection pattern of light reflected from the micromirror 4. The edge 18 of the micromirror 4 moves about the reference surface 16 while maintaining a movable point of contact 19 between the edge 18 and the reference surface 16.

Referring now generally to the Figures and particularly to FIGS. 3A, 3B and 3C, the FIGS. 3A and 3B are isometric views of a first alternate preferred embodiment of the present invention 20, having a set of electrostatic actuator plates 22 arranged in a cone-like shape. The electrostatic actuator plates 22 are individually shaped for forming a cone when combined and positioned to form an actuator cone 24. The micromirror 4 is shown in a zero actuation position Z2 in FIG. 3A and in an actuated position A2 in FIG. 3B.

Referring now generally to the Figures and particularly to FIG. 3C, the micromirror 4 of the first alternate preferred embodiment 20 rotates in two degrees of freedom about a pivot point 26. The pivot point 26 may be enabled by a mirror pivot feature 28 and an actuator pivot feature 30. The micromirror pivot feature 28 mechanically interacts with the actuator pivot feature 30 to establish the geometric pivot point 26, whereby the micromirror 4 rotates about the pivot point 26 as the micromirror 4 is tilted by the actuator plates 22, as shown in FIG. 3A. The micromirror 4 moves about the pivot point 26 in reaction to the forces imposed on the micromirror 4 by the actuator plates 22 and the suspension components 10.

Referring now generally to the Figures and particularly to FIG. 4A, a side view of the first alternate rolling mirror 20 in the zero actuation position of Z2, as shown in FIG. 3A, is presented. The actuator plates 22 are separated by gaps 32. An underside 34 of the micromirror 4 is shown as the micromirror 4 suspended in the zero actuation position Z2.

Referring now generally to the Figures and particularly to FIG. 4B, a side view of the first alternate rolling mirror 20 is shown in the actuation position of A2, as shown in FIG. 3A, is presented in side view. The micromirror 4 moves about a reference surface 36 while maintaining a movable point of contact 37 with the reference surface 36. The actuator plates 22 may be individually shaped to substantially form a pyramid or alternatively a cone 24, or a substantially pyramidal or conical shape, or a shape contained within a pyramid-bounding or a cone-bounding surface. In operation, the actuator plates 22 apply electrostatic forces to move the micromirror 4 about the pivot point 26 and to bring the micromirror into contact with a reference surface 36.

Referring now generally to Figures and particularly to FIGS. 5A and 5B, the micromirror 4 of a second alternate preferred embodiment 38, or second alternate 38, is shown in a zero actuation position Z3 in FIG. 5A, and in an actuated position A3 in FIG. 5B respectively. A plurality of shaped actuator plates 40 are sized to be combined as a quasi-cone 41 that decreases in cross-sectional area from the frame and towards the micromirror 4. The quasi-cone 41 is similar to, or topologically equivalent to, a cone or a pyramid, or is contained within a conical or a pyramidal bounding surface. In operation, the shaped actuator plates 40 apply electrostatic force to move the micromirror 4 towards and about the pivot point 26 and to bring the micromirror 4 into contact with reference surface 16 and thereby place the second alternate rolling mirror 38 into the actuated position A3. The edge 18 of the micromirror 4 moves about the reference surface 16 while maintaining a shifting point of contact 19 between the edge 18 and the reference surface 16.

Referring now generally to the drawings and particularly to FIGS. 6A and 6B, FIGS. 6A and 6B are isometric views of a third alternate preferred embodiment of the present invention 44, having a micromirror 46 with a cone body 47.

The micromirror 46 is shown in a zero actuation position Z4 in FIG. 6A and in an actuated position A4 in FIG. 6B respectively. The third alternate preferred embodiment 44, or third alternate 44, has a pivot point 26 located distal from the reflecting surface 5 of the micromirror 46. The micromirror 46 moves about the pivot point 26 in reaction to the forces imposed on the micromirror 46 by the actuators 8A and the suspension element 6. In operation, the actuators 8A apply electrostatic force to move the micromirror 46 towards and about the pivot point 26 and to bring the micromirror 46 into contact with the reference surface 16.

Referring now generally to the Figures and particularly to FIG. 7A, a side view of the third alternate rolling mirror 44 is shown in the zero actuation position of Z4, as shown in FIG. 6A. A sloped underside 48 of the cone body 47 of the micromirror 46 is shown as the micromirror 46 is suspended in the zero actuation position Z4.

Referring now generally to the Figures and particularly to FIG. 7B, a side view of the third alternate rolling mirror 44 is shown in the actuation position of A4, as shown in FIG. 6B. A reference surface 49 may comprise the actuators 8A and optionally the frame 14. When the third alternate rolling mirror 44 is actuated to be in actuation position A4, the micromirror sloped underside 48 touches the reference surface 49. The edge 18 of the micromirror 46 moves about the reference surface 49 while maintaining a movable line of contact 50 between the cone 47 and the reference surface 49.

Referring now generally to the Figures and particularly to FIGS. 8A and 8B, a fourth alternate preferred embodiment of the present invention 52, or fourth alternate 52, is shown in a zero actuation position Z5 in FIG. 8A and in an actuated position A5 in FIG. 8B. A micromirror body 54 of a micromirror 56 is similar to, or topologically equivalent to, a cone, or is contained within a bounding cone shape. The micromirror 56 moves about the pivot point 26 in reaction to the forces imposed on the micromirror 56 by the actuators 8A and the suspension element 6. In operation, the actuators 8A apply electrostatic forces to move the micromirror 56 about the pivot point 26 and to bring the micromirror 56 into contact with reference surface 16 and thereby place the fourth alternate rolling mirror 52 into the actuated position A5. The edge 18 of the micromirror 52 moves about the reference surface 16 while maintaining a shifting point of contact 19 between the edge 18 and the reference surface 16.

Figure 9A:
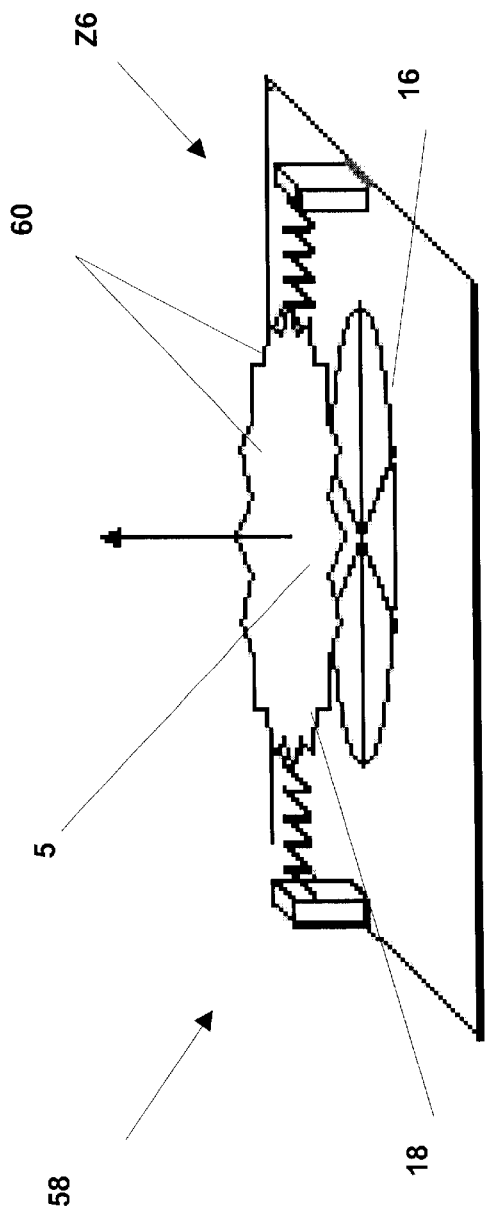
FIGS. 9A and 9B are isometric views of a micromirror, in two different actuation positions, and having a plurality of teeth extending from the micromirror.
Figure 9B:
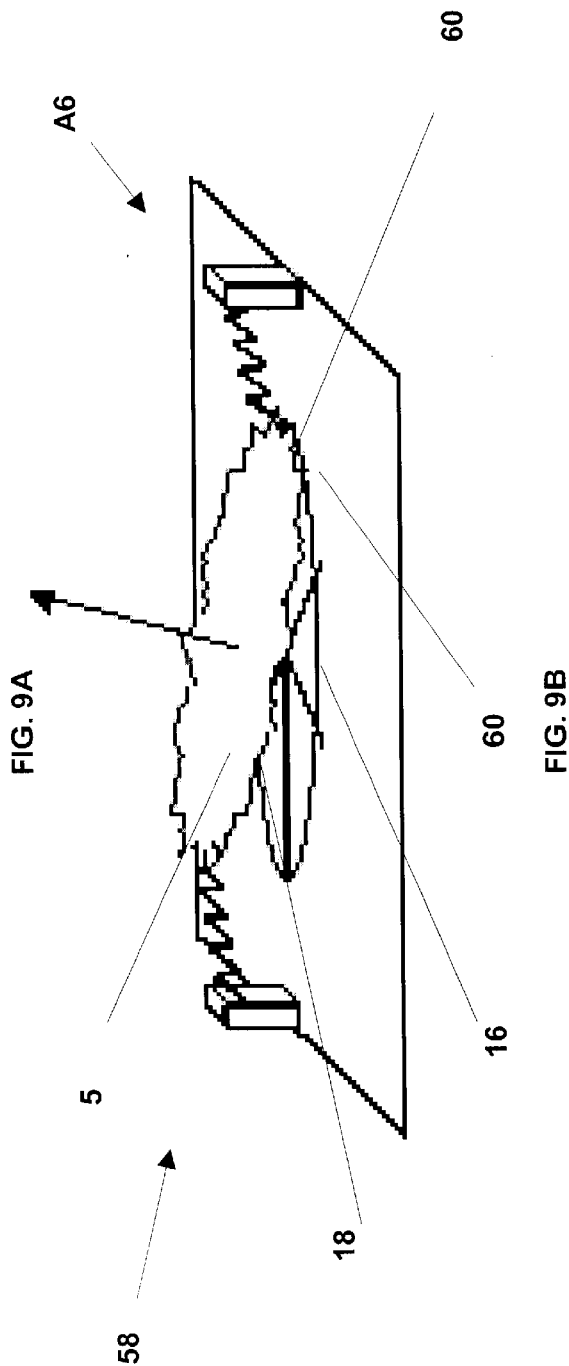

Referring now generally to the Figures and particularly to FIGS. 9A and 9B, a micromirror 58 has a plurality of teeth 60 along the edge 18 of the micromirror 58. FIGS. 9A and 9B show the micromirror 58 in a zero actuation position Z6 in FIG. 5A and in an actuated position A6 in FIG. 5B respectively. The teeth 60 extend from the reflecting surface 5 and to make contact with the reference surface 16 as the micromirror 58 is moved by the actuator 8. FIG. 9B shows two teeth 60 touching the reference surface 16 simultaneously.

Referring now generally to the Figures and particularly to FIG. 10, top views of three micromirrors 58, 62, & 64 are shown to have pluralities of teeth 60.

Figure 11:
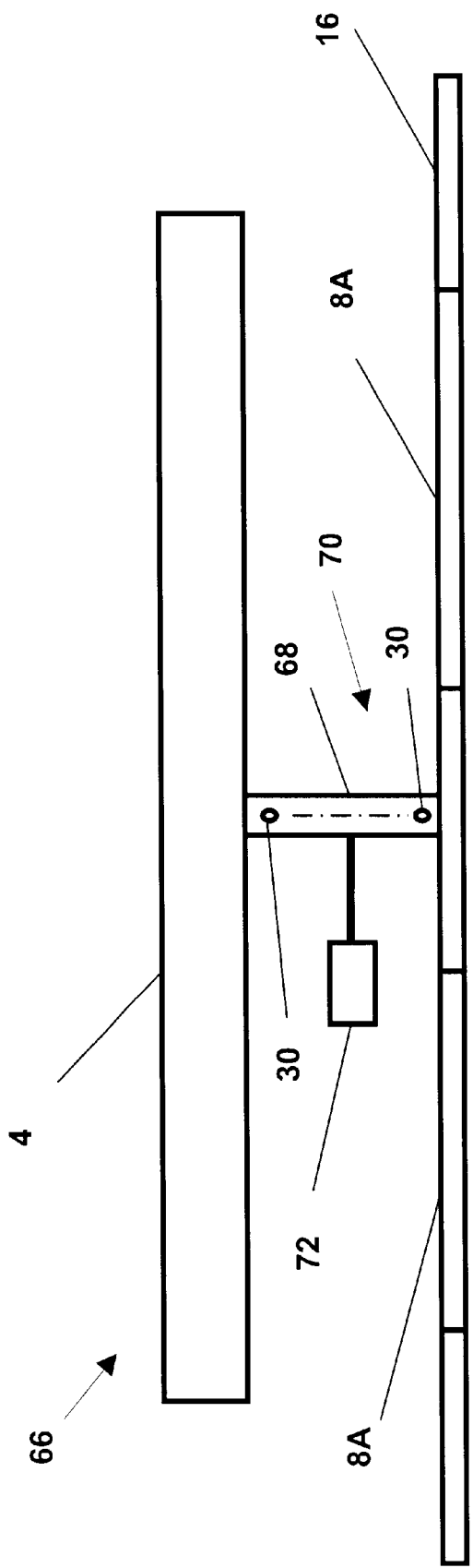
FIG. 11 is an example of an alternate pivot point enabling structure that has a movable pivot point.

Referring now generally to the Figures and particularly to FIG. 11, an alternate example of a pivot point and enabling structures is presented. The alternate pivot structure 66, as shown in FIG. 11, has a flexible beam 68 that couples the micromirror 4 to the reference surface 16. The micromirror 4 tilts, as affected by the actuators 8A, about an individual pivot point 30 located within a pivot point range 70. A pivot point actuator 72 is operatively coupled with the beam 68 and affects the beam 68 to determine the location of the pivot point 30, within the range 70, about which the micromirror 4 tilts.

Referring now generally to the Figures and particularly to FIGS. 12A and 12B, the range of micromirror tilt motion of a prior art MEMS 74, as per FIG. 12A, is about one third of the tilt range of the rolling mirror 2 of FIG. 1, as presented in FIG. 12B. The voltage required by the actuators 8A to move a prior art micromirror 76 of FIG. 12A is inversely proportional to the square of the distance between the prior art micromirror 76 and the actuators 8A.

Referring now generally to the Figures and particularly to FIG. 12B, the voltage required by the actuators 8A to move the micromirror 4 of rolling mirror 2 is inversely proportional to the square of the distance between the micromirror 4 and the actuators 8A. As the micromirror 4 is brought into contact with the reference surface 18 during operation of the rolling mirror 2, the minimum distance between the plane B and the micromirror 4 may be at zero or close to zero while the actuators 8A are moving the micromirror 4. The voltage required to move the micromirror 4 of the rolling mirror 2 to reflect a light beam is therefore less than the voltage required by the prior art MEMS mirror 74 to move the prior art micromirror 76 within the tilt range between plane M1 and plane M2. This optional reduction in operation voltage requirements for moving the micromirror 4 is an object of certain preferred embodiments of the method of the present invention.

The invention has been described in conjunction with the preferred embodiment. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

I claim:

1. A rolling micromirror for reflecting an incident light beam, the rolling micromirror comprising:
   a micromirror;
   an actuator, the actuator operatively coupled with the micromirror and for moving the micromirror;
   a suspension element, the suspension element operatively coupled with the micromirror, and the suspension element providing a restoring force to the micromirror when the micromirror is out of an initial position, wherein the restoring force returns the micromirror to the initial position; and
   a reference surface, the reference surface for guiding the motion of the micromirror in more than one dimension, wherein the micromirror maintains contact with the reference surface, and the contact between the micromirror and the reference surface moves when the micromirror moves, whereby the micromirror redirects the light beam.

2. The rolling micromirror of claim 1 wherein the micromirror has a contact edge, or edge, and the edge for maintaining contact with the reference surface, wherein the contact between the edge and the reference surface moves when the micromirror moves, whereby the micromirror redirects the light beam.

3. The rolling micromirror of claim 2 wherein the edge has at least one arc section.

4. The rolling micromirror of claim 2 wherein the edge has at least one curved section.

5. The rolling micromirror of claim 2 wherein the edge is substantially circular.

6. The rolling micromirror of claim 2 wherein the edge has at least one planar section.

7. The rolling micromirror of claim 2 wherein the edge has a plurality of sections, each section having at least one straight section.

8. The rolling micromirror of claim 2 wherein the edge further comprises a plurality of teeth, the plurality of teeth extending from the micromirror, and wherein at least two teeth simultaneously touch the reference surface.

9. The rolling micromirror of claim 1, wherein the suspension element comprises a suspension component selected from the group consisting of a spring, a tether, a beam and a diaphragm.

10. The rolling micromirror of claim 1, wherein the actuator applies force to the micromirror in relationship to a control signal, whereby the position of the micromirror is directed by the control signal.

11. The rolling micromirror of claim 1, wherein the actuator is selected from the group consisting of an electromechanical actuator, an electro-static actuator, a piezo-electric actuator, a thermo-mechanical actuator, an electromagnetic actuator, and a polymer actuator.

12. The rolling micromirror of claim 11, wherein the polymer actuator is selected from the group consisting of an electro-active polymer actuator, an optical-active polymer, a chemically active polymer actuator, a magneto-active polymer actuator, an acousto-active polymer actuator and a thermally active polymer actuator.

13. The rolling micromirror of claim 1, wherein the reference surface comprises at least one surface, and the at least one surface is selected from the group consisting of a planar surface, a conical surface, a curved surface, a ramped surface, and a spiraled ramp surface.

14. The rolling micromirror of claim 1, wherein the reference surface further comprises a plurality of shaped surfaces, wherein each shaped surface is selected from the group consisting of a planar surface, a conical surface, a circular surface, a curved surface, a ramped surface, and a spiraled ramp surface.

15. The rolling micromirror of claim 1, wherein the actuator comprises at least two electrostatic plates, and at least one plate having a shape selected from the group consisting of a cylindrical shape, a conical shape, a pyramidal shape, and a frustum component.

16. The rolling micromirror of claim 1, wherein the micromirror is pivotably coupled with the actuator.

17. The pivoted rolling micromirror of claim 16, wherein the micromirror body is shaped in a shape selected from the group consisting of a cylindrical shape, a conical shape, a pyramidal shape, and a frustum shape.

18. The pivoted rolling micromirror of claim 16, the micromirror further comprising a contact edge, wherein the contact edge, or edge, maintains contact with the reference surface, wherein the contact between the edge and the reference surface moves as the micromirror moves, whereby the micromirror redirects the light beam.

19. The pivoted rolling micromirror of claim 16, wherein the edge has at least one segment section.

20. The pivoted rolling micromirror of claim 16, wherein the edge is substantially circular.

21. The pivoted rolling micromirror of claim 16, wherein the edge has at least one straight section.

22. The pivoted rolling micromirror of claim 16, wherein the edge has a plurality of segment sections.

23. The pivoted rolling micromirror of claim 16, wherein the edge further comprises a plurality of teeth, the plurality of teeth extending from the micromirror, and wherein at least two teeth can simultaneously touch the reference surface.

24. The pivoted rolling micromirror of claim 16, wherein the suspension element comprises a component selected from the group consisting of a spring, a tether, a beam and a diaphragm.

25. The pivoted rolling micromirror of claim 16, wherein the actuator is selected from the group consisting of an electromechanical actuator, an electro-static actuator, a piezo-electric actuator, a thermo-mechanical actuator, an electromagnetic actuator, and a polymer actuator.

26. The pivoted rolling micromirror of claim 25, wherein the polymer actuator is selected from the group consisting of an electro-active polymer actuator, an optical-active polymer, a chemically active polymer actuator, a magneto-active polymer actuator, an acousto-active polymer actuator and a thermally active polymer actuator.

27. The pivoted rolling micromirror of claim 16, wherein the actuator applies force against to micromirror in relationship to a control signal, whereby the position of the micromirror is directed by the control signal.

28. The pivoted rolling micromirror of claim 16, wherein the reference surface comprises at least one surface, the at least one surface is selected from the group consisting of a planar surface, a conical surface, a curved surface, a ramped surface, and a spiraled ramp surface.

29. The pivoted rolling micromirror of claim 16, wherein the reference surface further comprises a plurality of surfaces, wherein at least one surface is selected from the group consisting of a planar surface, a conical surface, a curved surface, a ramped surface, and a spiraled ramp surface.

30. The pivoted rolling micromirror of claim 16, further comprising a pivot point, wherein the micromirror pivots about the pivot point and the pivot point is substantially fixed in relation to the reference surface.

31. The pivoted rolling pivoted of claim 16, further comprising a pivot point, wherein the micromirror pivots about the pivot point and the pivot point is movable in relation to the reference surface.

32. The pivoted rolling micromirror of claim 31, further comprising a pivot point actuator, wherein the pivot point actuator moves the pivot point in relation to the reference surface.

33. The pivoted rolling micromirror of claim 16, wherein the micromirror further comprises a body, and the body has a shape selected from the group consisting of a cylindrical shape, a conical shape, a pyramidal shape, and a frustum shape.

34. The pivoted rolling micromirror of claim 16, wherein the actuator comprises at least two actuator plates, and at least one actuator plate having a shape selected from the group consisting of a cylindrical shape, a conical shape, a pyramidal shape, and a frustum component.

35. A method of altering a reflection path of a light beam from a micromirror by moving and positioning the micromirror, the method comprising:

a. Providing a micromirror;
   b. Providing a reference surface, the micromirror movable in relation to the reference surface, and the reference surface for guiding the motion of the micromirror, wherein the micromirror maintains contact with the reference surface, and the contact between the micromirror and the reference surface moves as the micromirror moves;
   c. Providing an actuator, the actuator for moving the micromirror while the micromirror continues to dynamically maintain contact with the reference surface, and the actuator moving the micromirror in relationship to a control signal transmitted to the actuator; and
   d. Transmitting the control signal to the actuator, whereby the actuator causes the micromirror to move, and the reflected light beam is redirected.

* * * * *